United States Patent Office 2,981,639
Patented Apr. 25, 1961

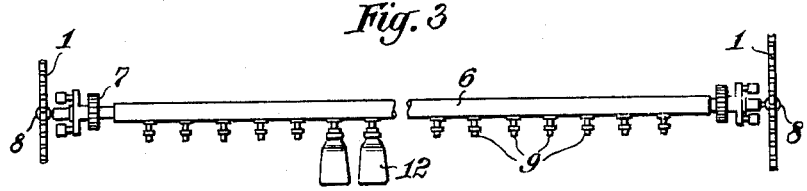
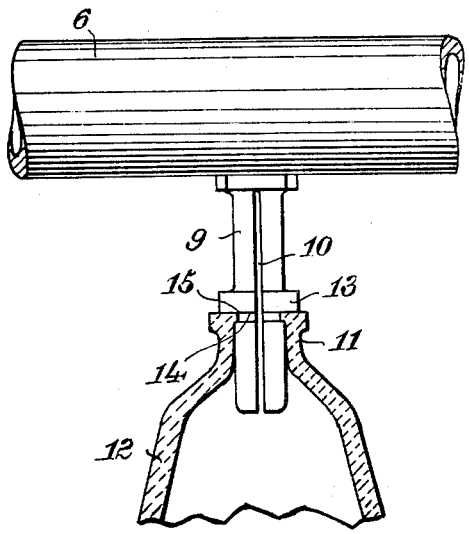

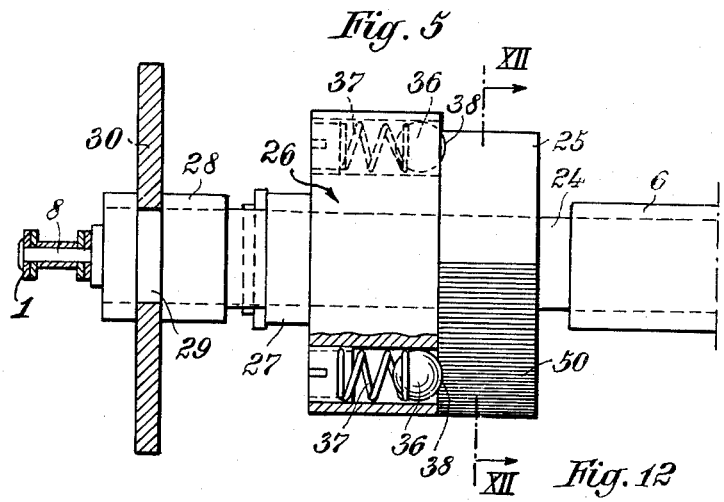
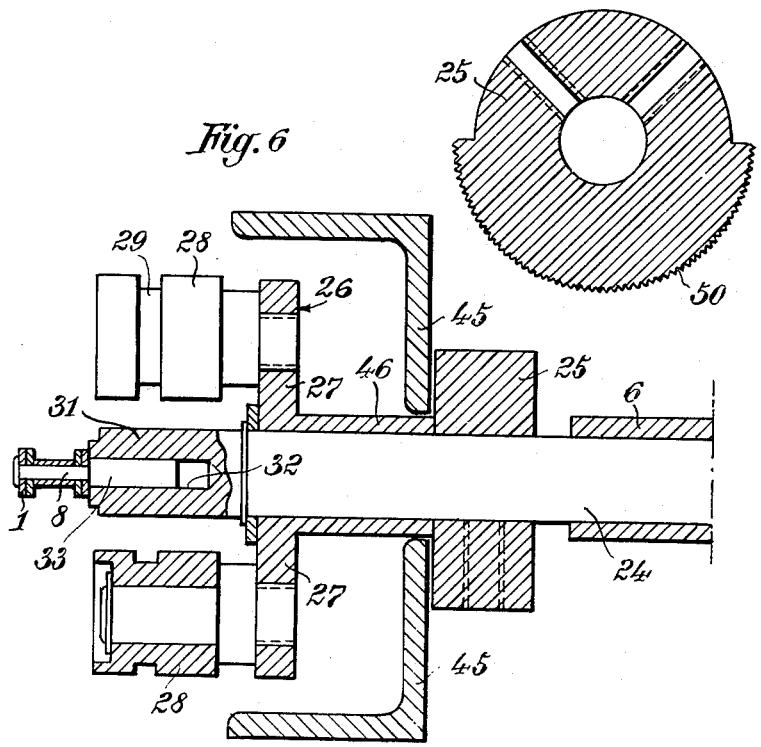

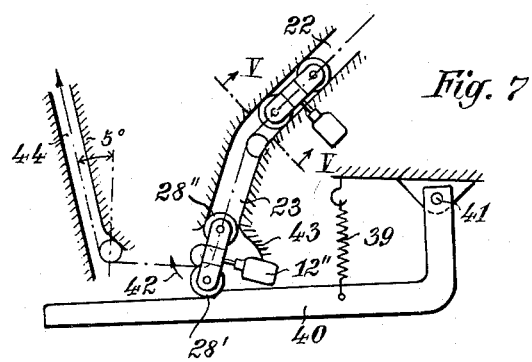
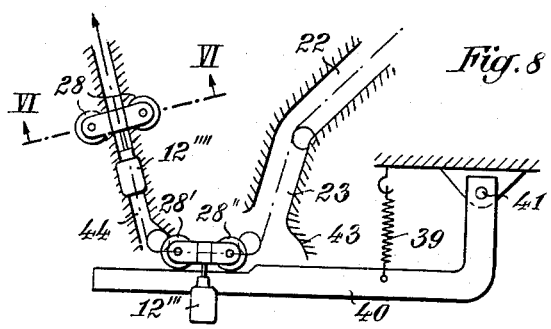
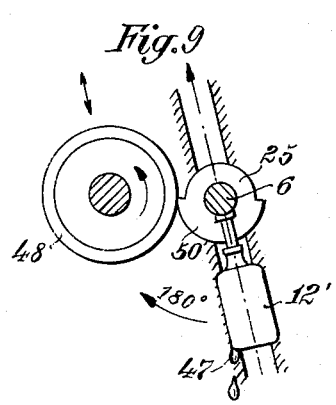
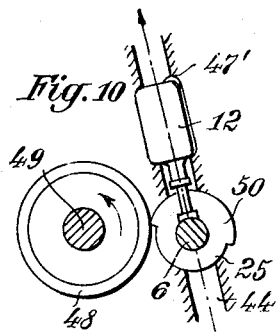

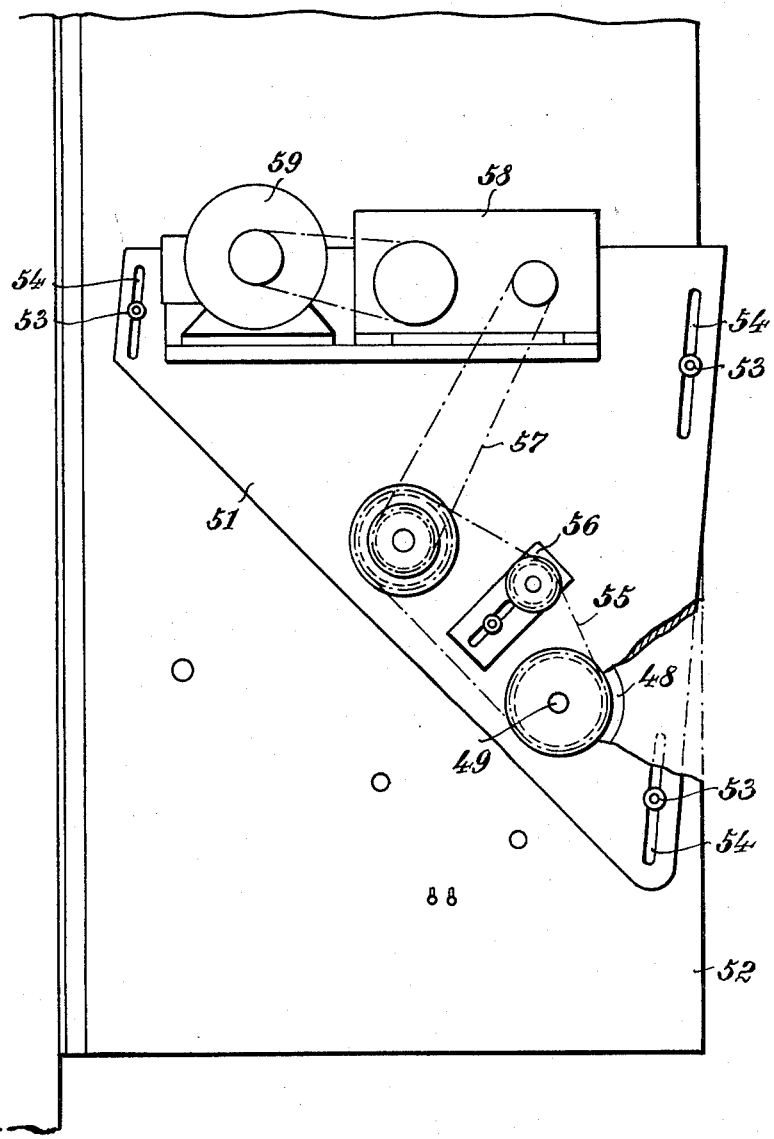

2,981,639
PROCESS AND APPARATUS FOR COATING GLASS ARTICLES OR THE LIKE BY MEANS OF DIPPING

Wilhelm Kachele, Jahnstrasse 11, Weilheim, Teck, Germany

Filed Oct. 15, 1956, Ser. No. 616,041
Claims priority, application Germany Oct. 20, 1955
11 Claims. (Cl. 117—113)

The invention relates to the coating of articles made of glass or other materials, for example bottles, with a non-metallic organic substance or mixture of substances of natural or synthetic nature, which initially has the property of a liquid, or of a paste which covers the article dipped thereinto in a more or less thick coherent layer, the latter thereafter being solidified by a heat treatment or chemical treatment. The degree of solidification of the coating can vary, ranging from a viscous yieldable condition to a considerable degree of hardness.

The prior proposed processes for applying such coatings to glass bottles or the like make use of an intermittent working method, in which the article being treated and if necessary preheated, is dipped into and withdrawn from the liquid or pasty coating mass. The output capacities of such arrangements are comparatively low. They also require comparatively complicated control and movement means and not an inconsiderable amount of supplementary manual labour.

The object of the present invention is the development of a fully continuous process for the production of plastic coatings or the like on glass articles or the like, in which the article is conducted in a steady working process, for example, first of all through a preheating stage, then through the dipping bath and finally through the hardening or gelling oven, it also being possible for the supply and withdrawal of the untreated bottles or other articles to take place in a fully automatic manner.

In order to achieve this object with the process forming the subject of the invention, the element to be coated, for example a glass bottle, is arranged on a carrier which runs in a closed guide track and receives its motion, for example, from endless chains which travel along the said track. After the bottle to be coated has passed through the preheating stage, it is brought by means of this carrier up to the surface of the bath in a position which can range from substantially inverted vertical to horizontal position, and from this position, as soon as the carrier is sufficiently close to the bath surface, it is dipped into the bath by a sudden swinging of the carrier until in a substantially vertical position, and in this position the article is then moved by lateral displacement into the range of an upwardly travelling section of the guide track for the carrier, in which the article is slowly lifted out of the bath in a slightly inclined position in order after leaving the bath to be swung upwardly rapidly through substantially 180° so that it is, in effect, upside down and is introduced in this position into the gelling or hardening stage of the circuit.

The process according to the invention provides, first of all, the advantage that a large number of bottles can be coated per unit of time in a completely uniform manner with the coating mass. Since applicant's process is a fully continuous process, the working conditions in the individual stages of the process can be kept constant with great accuracy, this being of decisive importance for the formation of uniform coatings. The capacity of the process according to the invention is consequently high, because a large number of bottles can be arranged on a single carrier and can be dipped or swung simultaneously into the bath and, additionally, it is possible for a series of carriers to be arranged in the circuit, these carriers only being at a small distance from one another. Finally, the bar-shaped carriers, which are used for the process according to the invention and on which it is possible to mount a series of bottles or the like, permit a series of untreated bottles to be arranged simultaneously by an automatic supply device on the carriers arriving from the circuit and, also, to remove the bottles provided with the gelled or solidified coating at the end of the circuit. The arrangement necessary for carrying the process into effect is comparatively simple and is reliable in operation. It does not require any manual labour and the servicing thereof is limited to the usual supervision of the moving mechanisms, the regulation of the temperature of the preheating and hardening ovens and the composition and temperature of the dipping bath.

One practical embodiment for carrying the invention into effect is shown by way of example in the drawing.

Fig. 3 shows to a larger scale a carrier which is suitable for the treatment of glass bottles.

Fig. 4 is a view to a larger scale showing a part of the carrier according to Fig. 3.

Fig. 5 is a sectional view on the line V—V of Fig. 7 showing the construction of the ends of the carrier.

Fig. 6 is a section on the line VI—VI of Fig. 8 to a larger scale.

Fig. 7 is a diagrammatic view to a larger scale showing the construction of the guide track in the section in which the operations of swinging or reversing the articles and dipping them into the plastic bath take place.

Fig. 8 shows the arrangement according to Fig. 7 in another working position.

Figs. 9 and 10 show diagrammatically the movement means for reversing the articles lifted out of the plastic bath.

Fig. 11 shows a practical construction for the arrangement shown diagrammatically in Figs. 9 and 10, and Fig. 12 is finally a vertical section on the line XII—XII of Fig. 5.

Figure 1:
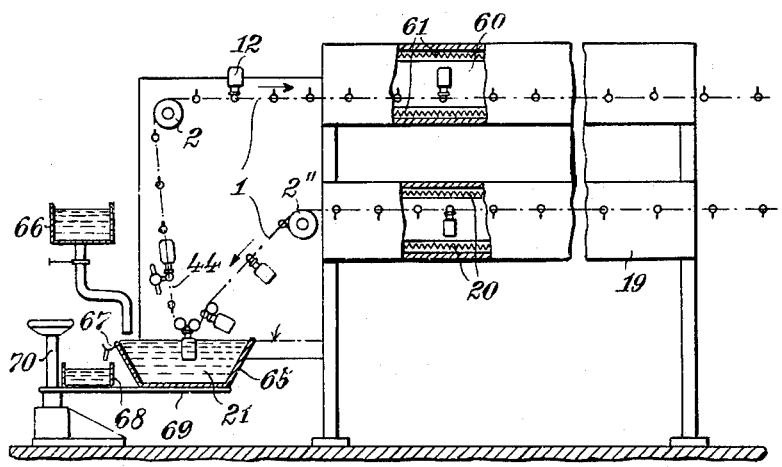
Figs. 1 and 2 show diagrammatically a side elevation and vertical section, respectively, of the complete arrangement for carrying out the process according to the invention.
Figure 2:
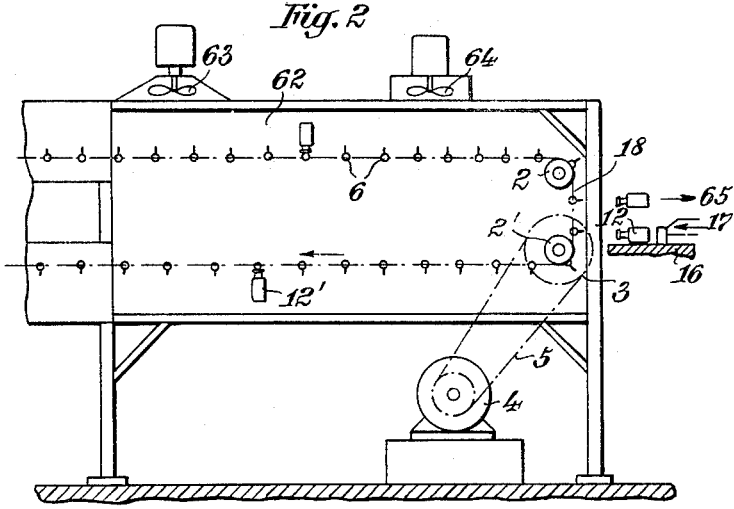

As will be seen from Fig. 1, the preferred arrangement used for carrying the process of the invention into effect comprises a travelling endless traction member 1, constructed for example as a sprocket chain, which is led over a series of guide rollers 2, one of which (the roller 2') is connected to a sprocket wheel 3 (see Fig. 2) over which runs the driving chain 5 from the motor 4. By this means, the endless chain 1 is kept moving at a uniform speed, it being possible for the speed of travel to be adjusted in suitable manner by the provision of suitable regulating gears. The arrangement preferably comprises two chains 1 which travel parallel to one another and between which are arranged the bar-shaped carriers 6 for the articles to be treated. As will be seen from Figs. 3 and 4, these carriers advantageously consist of a tubular member, for example, made of steel, which is connected at both ends to one of the pins 8 of the endless chains 1 by means of a coupling device 7, which is more fully explained hereinafter.

Fixed to the carrier 6 is a series of pins 9 disposed parallel to one another, these pins being provided with longitudinal slots 10, as will be seen in Fig. 4. These pins 9 consist of a resilient material, such as spring steel. They are of such dimensions that the neck 11 of the bottle 12 or other hollow element to be treated can be fitted thereon, as shown in Fig. 4. If articles other than bottles or hollow elements are to be treated, then holding elements of other suitable shape are arranged on the carriers 6 for the articles to be treated, such holding means being for example clips, or suction members to which the article pressed thereon will adhere, or other means.

For the treatment of glass bottles or the like, the preferred arrangement for the purposes of the invention, is that shown in Fig. 4. In this case, the holding pin 9 comprises a collar 13, the rim of the bottle mouth 11 bearing flat against the said collar. Underneath the collar 13, the pin 9 is provided with an encircling groove 14, which is engaged as a tight-fit by an inwardly directed rim bead 15 provided on the mouth 11 of the bottle. Due to this arrangement, it is ensured that the bottle 12 to be treated can be rigidly and non-displaceably secured on the carrier pin 9 in a position which is always exactly the same.

The carrier 6 is provided with a relatively large number of holding pins 9, as will be seen from Fig. 3, so that a large number of bottles 12 can be fitted on to one carrier.

With the holding pins 9 arranged on the carrier 6 in the manner described, it is possible for a relatively large number of the glass bottles or the like undergoing treatment to be supplied automatically and simultaneously. For this purpose, the supply end of the arrangement is provided with a table 16 (Fig. 2), with which is associated a feed piston 17. The table 16 is disposed adjacent the vertical run 18 of the guide track for the carriers 6, whereby a series of untreated bottles 12 laid out on the table at the correct spacing from one another can be automatically advanced by means of the piston 17 simultaneously on to the holding pins of the individual carriers 6. The piston 17 then returns to its initial position and is charged with a fresh series of untreated bottles, whereupon the supply operation is repeated with the arrival of the next carrier 6. Table 16 can be arranged to move vertically in synchronism with the carriers 6 if desired.

The carriers 6 are swivelled at the reversal roller 2', so that the bottles or other articles are brought into a vertical position, as indicated at 12'. In this position, the carriers now travel with the bottles through the preheating stage 19 of the process, this stage being equipped for example with electric heating elements 20. In the preheating stage, the bottles or other articles are preheated to that temperature which they require for the formation of a uniform coating of the required thickness on being immersed in the dipping bath.

On leaving the pre-heating stage, the carriers are guided at a downward inclination by the guide roller 2" in the direction towards the dipping bath 21. The movements which now take place will be seen from Figs. 7 and 8.

In Figs. 7 and 8, the section of the guide track into which the carriers pass after leaving the guide roller 2" is indicated at 22. The track 22 changes into a substantially vertical section 23, in which the carriers are advantageously further rocked in such manner that the glass bottles 12" assume a substantially horizontal position (Fig. 7). They are brought close to the surface of the dipping bath 21 in this position and then immersed in the bath by a sudden rocking of the carrier 6 in a clockwise direction, this movement taking place with an adjustable angular velocity and until the bottles assume a substantially vertical position, as indicated at 12''' in Fig. 8.

In order to effect this movement of the carrier 6, the invention advantageously makes use of the following mechanism, which is to be seen in Fig. 5.

The end of the carrier 6 terminates in a pin 24 (Fig. 5), on which the clutch plate 25 is fixedly arranged and the clutch part 26 is rotatably arranged. Connected to the clutch part 26 is a double lever 27 (Fig. 6), each arm of which has rotatably mounted thereon a guide roller 28 formed with a central groove 29 engaged by the slotted guide rail 30. That end 31 of the pin 24 of the carrier 6 which projects beyond the double lever 28 is formed with a bore 32 which is engaged by the lateral extension 33 of one of the link pins 8 of the sprocket chain 1.

The clutch parts 25 and 26 form an overload clutch. The part 26 includes arms 46 arranged at right angles to arms 27 having bores in which steel balls 36 are arranged under the pressure of a spring 37. Formed in the end wall of the clutch part 25 are recesses 38, which are resiliently engaged by the balls 36. As will readily be seen from Fig. 5 the part 25 can be rotated in relation to the clutch part 26 by overcoming the pressure of the steel balls 36, this taking place in the manner which is hereinafter to be fully described.

The sections 22 and 23 of the guide track (Figs. 7 and 8) are formed by slotted rails 30, as shown in Fig. 5. Since each carrier is provided at the end with two guide rollers 28, the carriers run through the sections 22 and 23 of the guide track without changing their radial position in relation to the rails 30. At the end of the guide track 23, that guide roller 28' of the carrier 6 which is at the front in the direction of movement now leaves the slot of the rail 30, while the rear roller 28" is still in the range of the carrier rail and consequently maintains its position. The front roller now strikes against a lever 40 which is yieldably held by a spring 39 in the direction of the guide track 23, the said lever being pivotally mounted at 41 in the machine frame. Since the guide track 23 is slightly inclined, the lever 40 tends to advance the front guide roller 28' in the direction of the arrow 42. This movement starts as soon as the rear roller 28" reaches the zone 43 of the guide track 23.

In this way, the spring-loaded lever 40 is able to rock the two guide rollers 28' and 28" into a substantially horizontal plane, as will be seen from Fig. 8, so that the article 12''' held by the associated carrier comes into a vertical position.

Since a pair of guide rollers 28 is arranged at each end of the carrier, the arrangement consequently has two spring-loaded levers 40 arranged on both sides of the carrier track.

Instead of the bottles or the like being moved through the preheating stage while suspended on the carriers, it is also possible to rock the carrier in such a manner that the bottles are seated inverted vertically on the pins 9. The bottles can be conducted to the surface of the dipping bath in this position or in any other required intermediate postion to the horizontal. The guiding and moving means for the carrier are then to be designed accordingly.

In the position which can be seen in Fig. 8, the carrier and with it the article dipped into the bath (Fig. 1) travels a certain distance horizontally through the bath until the carrier comes into the range of the upwardly moving section 44 of the track.

In this section of the track, the guiding arrangement is formed by the rails 45 (Fig. 6), which are arranged in the frame in such manner that the part 46, which is made with a rectangular profile and on which the double lever 27 of the carrier 6 is mounted, can engage with a suitable fit in the space between the rails 45. By this means, the positions of the double lever 27 and of the clutch part 26 connected thereto are established, and as will be seen from Fig. 8, this position is such that the plane of the guide rollers 28 extend at an inclination to the horizontal and accordingly the bottle 12 fixed on the carrier is retained in a position corresponding to a suitable angle relatively to the vertical. In this position, the bottle 12 or the like is slowly lifted out of the bath.

The excess of coating mass running off the bottle when it is lifted out of the bath accumulates at the lowest point of the article in a drop-like thickening 47 when the bottle or other article is lifted out in a certain inclined position. In order to remove this thickening, which no longer falls off in the form of a droplet, it is proposed according to the invention that the article should be rotated rapidly through about 180° as soon as it is lifted completely out of the bath, so that it assumes the position which can be seen in Fig. 10. That point of the article which assumes the lowest position on lifting out of the bath is then disposed at the highest point after being rotated, as indicated at 47' in Fig. 10. By this means, it is possible for the thickening 47' to be distributed uniformly over the inclined base of the bottle 12 during the further upward travel.

In order to effect the swinging movement of the bottle carrier according to Figs. 9 and 10, a friction wheel 48 is arranged adjacent each guide track 44, the shaft 49 of the friction wheel being rotatably mounted in the machine frame and being connected to a drive means shown in Fig. 11.

The friction wheels 48 each project into the path of movement of a friction segment 50, which is provided fast on the two ends of the carrier, as shown in Fig. 5. With the upward travel of the carrier 6, the friction segments 50 strike against the driven friction wheels 48 and are rocked by the latter relatively to the clutch part 26 and the guide means 45, overcoming the overload clutch produced by the balls 36, until the friction segments 50 have again passed out of the range of the friction wheels 48. The carrier 6 and the bottles 12 fixed thereon then assume the position which is shown in Fig. 10.

In order that the friction wheel 48 can be easily adjusted in relation to the guide track 44 and the range of movement of the friction segments 50, it is advantageous to use the arrangement shown in Fig. 11. In this figure, the friction wheel 48 is mounted by its shaft 49 in plates 51 which are adjustably secured to the machine frame 52 by means of clamping screws 53 extending through slots 54 in the plate 51. The friction wheel 48 is driven by a chain 55, which is connected to a tensioning device 56 and receives its drive through the tension member 57 and the gear 58 from the motor 59. The gear 58 is preferably of the infinitely variable type, so that the speed of the friction disc 48 and thus the speed of the upward swinging of the bottles 12 on the carriers 6 can be regulated. By using a synchronous motor for driving the friction disc 48, the uniformity of the adjusted speed is guaranteed.

As shown in Fig. 1, the bottle provided with the coating travels upwardly as far as the left-hand upper guide roller 2. Beyond this guide roller, there is provided a guide rail arrangement according to Fig. 5. By this means, the two pairs of guide rollers 28 of the carrier 6 are again guided into the horizontal position. The bottles or other articles 12 on the carriers are thus directed upwardly, as illustrated, and travel in this position into the gelling or hardening stage of the system. This stage of the process is equipped with heater elements 61, which maintain the temperature necessary for the gelling or hardening operation.

The bottles provided with the solidified coating finally enter the chamber 62, which is equipped with a suction fan 63 and a cooling air fan 64, and can finally be removed at 65 from the carriers, for example by means of rake-like gripper devices, which simultaneously strip off the bottles over the entire length of a carrier 6. Any suitable means may be provided to rotate the friction segment 50 from its Figure 10 position back to its Figure 9 position, so that the cycle of operation may be repeated.

For the formation of a uniform coating, it is necessary that the dipping bath 21 constantly maintains the same consistency and composition. For this purpose, the dipping mass of the tank 65 is constantly supplied according to the invention from a storage tank 66. The dipping tank 65 is provided with an overflow 67, over which the excess mass flows into the storage tank 68. The table 69 on which the dipping tank stands is adapted to be raised and lowered, for example by means of spindles 70, so that the height of the overflow 67 can be accurately adjusted in relation to the guide track of the bottles. By this means, it is possible for the immersion depth of the bottles or other articles into the bath to be kept exactly constant, this being of importance when the coating on the bottles or the like is to be formed up to a certain height thereon.

The coating on the glass bottle or the like can be of any desired thickness. The process according to the invention is particularly suitable for applying coatings to glass bottles which are used with a high internal pressure and in which the viscous yieldable coating prevents glass splinters being projected when the glass element is broken. The process is also suitable for forming coatings which are not electrically conducting on metal articles, and also for the manufacture of relatively thin-walled elements on formers, from which the coating is stripped after it has solidified.

Any suitable plastic or natural substance, including latex, can be considered as the coating mass.

In carrying the process according to the invention into effect, the procedure is for example as follows:

The dipping bath consists of a mixture of 50 parts of polyvinyl chloride in powder form and 50 parts of a suitable plasticiser, for example dioctyl phthalate. The temperture of the dipping bath can be normal, for example about 20° C., and the temperature of the bottles about 80–100° C.

I claim:

1. A continuous method of coating an article with a uniform coating by immersing said article in a fluid coating bath, which method consists in moving at a uniform speed a succession or articles toward said coating bath; applying an accelerating force to rotate each article about an axis of rotation external to said article, said article having an initial position in which said axis and said article are horizontally aligned, said accelerating force rotating said article from said initial position through an arc of substantially 90° toward said bath to a second position in which the article is immersed, and in which said article and said axis are vertically aligned; withdrawing each article in a substantially vertical direction, and rapidly inverting each article by rotation about said axis shortly after withdrawal from the bath.

2. Method according to claim 1, wherein the coating mass is hardenable, the articles to be coated are passed through a preheating zone in advance of the coating bath, and the coated articles are passed through a coating hardening zone.

3. Method according to claim 1, wherein the immersed article travels in a substantially horizontal path in the liquid bath.

4. Method according to claim 1, wherein each article passing through the hardening zone is maintained in a position inverted relative to its position when immersed in said coating bath.

5. Method according to claim 1, including the step of adjusting the depth of immersion of the articles in the bath.

6. In a machine for coating articles by immersion in a liquid coating bath of the type including a conveyor including a series of horizontal transverse carriers, means driving said conveyor and carriers at a uniform speed along an endless path, said path including a first portion along which said carriers move toward the surface of the bath, a second portion along which said carriers move from said first portion across said surface, and a third portion extending from the end of said second portion to the beginning of the first portion, the improvement which comprises article-receiving support means rotatable about said carriers as an axis; means for guiding said supports so that the carriers and the articles lie in a substantially horizontal plane during carrier movement along said first portion; means to apply an accelerating force to rotate each article about said axis through an arc of substantially 90° as it approaches the second portion, said rotation being in the direction of the bath whereby the article is immersed; means inhibiting rotation of the article about said axis while the article is immersed and during withdrawal from the bath; and means effective to rotate said supports rapidly through an arc of 180° during carrier movement along said third portion and after article withdrawal from the bath.

7. A machine according to claim 6, comprising means for advancing each article in a horizontal direction in the bath.

8. A machine according to claim 6, including means for preheating the articles in advance of the coating bath and means for hardening the coating on the removed coated articles.

9. A machine according to claim 6, comprising a source of liquid coating material for the bath, an overflow on said bath, and means for raising and lowering the bath relative to the conveyor, whereby the depth of immersion of the articles in the bath can be adjusted.

10. A machine according to claim 6, wherein said supports comprise a plurality of resilient holding means for the articles.

11. A machine according to claim 6, wherein said supports comprise a plurality of resilient holding means for hollow articles and adapted for insertion in the mouth of said articles, said holding means provided with a collar adapted to bear against the mouth of the hollow articles.

References Cited in the file of this patent
UNITED STATES PATENTS

| | | |
|---|---|---|
| 1,042,914 | Heyl | Oct. 29, 1912 |
| 1,151,636 | Weis | Aug. 31, 1915 |
| 1,672,857 | Blake et al. | June 5, 1928 |
| 2,044,077 | Jones | June 16, 1936 |
| 2,119,720 | Reifsnyder | June 7, 1938 |
| 2,159,091 | Kopitke | May 23, 1939 |
| 2,165,364 | Ferngren | July 11, 1939 |
| 2,282,896 | Snader et al. | May 12, 1942 |
| 2,302,053 | Price | Nov. 17, 1942 |
| 2,380,968 | Kimmig et al. | Aug. 7, 1945 |
| 2,812,269 | Ransburg | Nov. 5, 1957 |